US006210613B1

(12) United States Patent
Stein et al.

(10) Patent No.: US 6,210,613 B1
(45) Date of Patent: Apr. 3, 2001

(54) METHOD OF MAKING A DOOR TRIM PANEL ASSEMBLY

(75) Inventors: Arthur Carl Stein, Grosse Ile; Pamela Lane Codd, Utica; Carl Henry Visconti, Clarkston, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/318,696

(22) Filed: May 25, 1999

(51) Int. Cl.[7] .......................... B29C 44/06; B29C 44/12
(52) U.S. Cl. ........................................ 264/45.4; 264/46.4
(58) Field of Search .................... 264/46.4, 45.4

(56) References Cited

U.S. PATENT DOCUMENTS

| 4,420,447 | * | 12/1983 | Nakashima | 264/46.4 |
| 4,519,964 | * | 5/1985 | Rosen | 264/45.4 |
| 5,340,425 | * | 8/1994 | Strapazzini | 156/212 |
| 5,411,688 | * | 5/1995 | Morrison et al. | 264/45.4 |
| 5,928,776 | * | 7/1999 | Shioya et al. | 264/45.4 |

FOREIGN PATENT DOCUMENTS

| 52-27665 | * | 7/1977 | (JP) | 264/45.4 |
| 55-118837 | * | 9/1980 | (JP) | 264/45.4 |

* cited by examiner

Primary Examiner—Allan R. Kuhns
(74) Attorney, Agent, or Firm—Patrick M. Griffin

(57) ABSTRACT

A method of making a door trim panel assembly for attachment to an inner panel of an automotive vehicle includes the steps of placing a door trim substrate into a cavity of a mold and placing at least one component into the cavity against the door trim substrate. The method also includes as an alternative of pre-joining the at least one component to the door trim substrate. The method also includes the steps of filling the cavity with a plastic material. The method further includes the steps of introducing steam into the mold to expand the plastic material to form a carrier and bond the carrier against the at least one component and door trim substrate to form a single door trim panel assembly.

13 Claims, 3 Drawing Sheets

METHOD OF MAKING A DOOR TRIM PANEL ASSEMBLY

TECHNICAL FIELD

The present invention relates generally to door trim panels for vehicles and, more particularly, to a method of making a door trim panel assembly for an automotive vehicle.

BACKGROUND OF THE INVENTION

It is known to provide a door trim panel assembly for a vehicle such as an automotive vehicle to present an aesthetically pleasing appearance in an occupant compartment of the automotive vehicle. The door trim panel assembly includes a plurality of separate components with each component having a specific function. The components typically include a door trim substrate, sound absorber, water barrier, insert, armrest, and map pocket closeout and side impact blocks. The components are assembled together and attached to a door trim substrate by several different conventional processes including adhesives, heat staking, sonic welding and fasteners. The door trim panel assembly is then mounted to an inner door panel of a door for the automotive vehicle by suitable means such as fasteners.

Although the above door trim panel assembly has worked well, it is desirable to reduce the number of components and costs associated with the purchase and assembly of the door trim panel assembly. It is also desirable to provide a door trim panel assembly with reduced mass, tooling and equipment per vehicle. Therefore, there is a need in the art to provide an improved method of making a door trim panel assembly for attachment to an inner panel of a door for an automotive vehicle.

SUMMARY OF THE INVENTION

It is, therefore, one object of the present invention to provide a new method of making a door trim panel assembly for an automotive vehicle.

It is another object of the present invention to provide a method of making a door trim panel assembly that incorporates many components into a single component for attachment to an inner panel of a door for an automotive vehicle.

It is yet another object of the present invention to provide a method of making a door trim panel assembly that is multi-functional for attachment to an inner panel of a door for an automotive vehicle.

It is still another object of the present invention to provide a method of making a door trim panel assembly that has fewer components and cost.

It is a further object of the present invention to provide a new method of making a door trim assembly that molds a door trim substrate to a door trim panel.

To achieve the foregoing objects, the present invention is a method of making a door trim panel assembly for attachment to an inner panel of a door for an automotive vehicle. The method includes the steps of placing a door trim substrate into a cavity of a mold and placing at least one component into the cavity against the door trim substrate. The method also includes the steps of filling the cavity with a plastic material. The method further includes the steps of introducing steam into the mold to expand the plastic material to form a carrier and bond the carrier against the at least one component and door trim substrate to form a single door trim panel assembly.

One advantage of the present invention is that an improved method of making a door trim panel assembly is provided for an automotive vehicle. Another advantage of the present invention is that the method of making the door trim panel assembly integrates a plurality of components into a single component. Yet another advantage of the present invention is that the method of making a door trim panel assembly reduces the number of separate components, labor, cost and tooling for the same. Still another advantage of the present invention is that the method of making a door trim panel assembly reduces material, mass and costs. A further advantage of the present invention is that the method of making a door trim panel assembly enhances recycling characteristics of the door trim panel assembly.

Other objects, features and advantages of the present invention will be readily appreciated, as the same becomes better understood after reading the subsequent description taken in conjunction with the accompanying drawings.

DESCRIPTION OF THE PREFERRED EMBODIMENT

Figure 1:
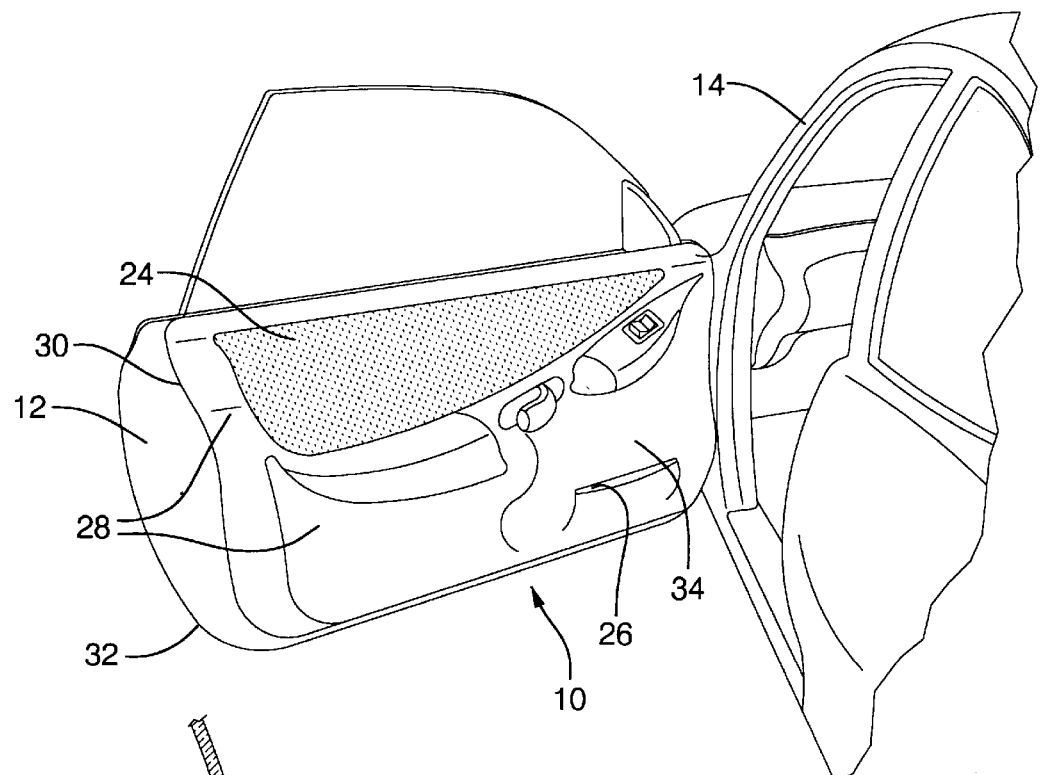
FIG. 1 is a perspective view of a door trim panel assembly, according to the present invention, illustrated in operational relationship with an automotive vehicle.
Figure 2:
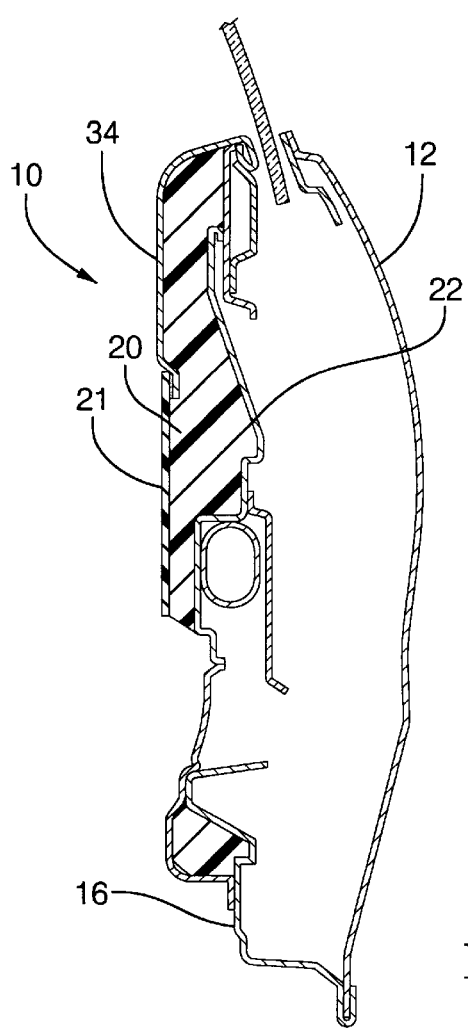
FIG. 2 is a fragmentary side view of the door trim panel assembly of FIG. 1.

Referring to the drawings and in particular FIGS. 1 and 2, one embodiment of a door trim panel assembly 10, according to the present invention, is shown mounted to a door 12 of a vehicle 14 such as an automotive vehicle. It should be appreciated that, in this example, the door trim panel assembly 10 is mounted to an inner panel 16 of the door 12. It should also be appreciated that the door trim panel assembly 10 may be an assembly mounted to other panels of the vehicle 14.

Figure 5:
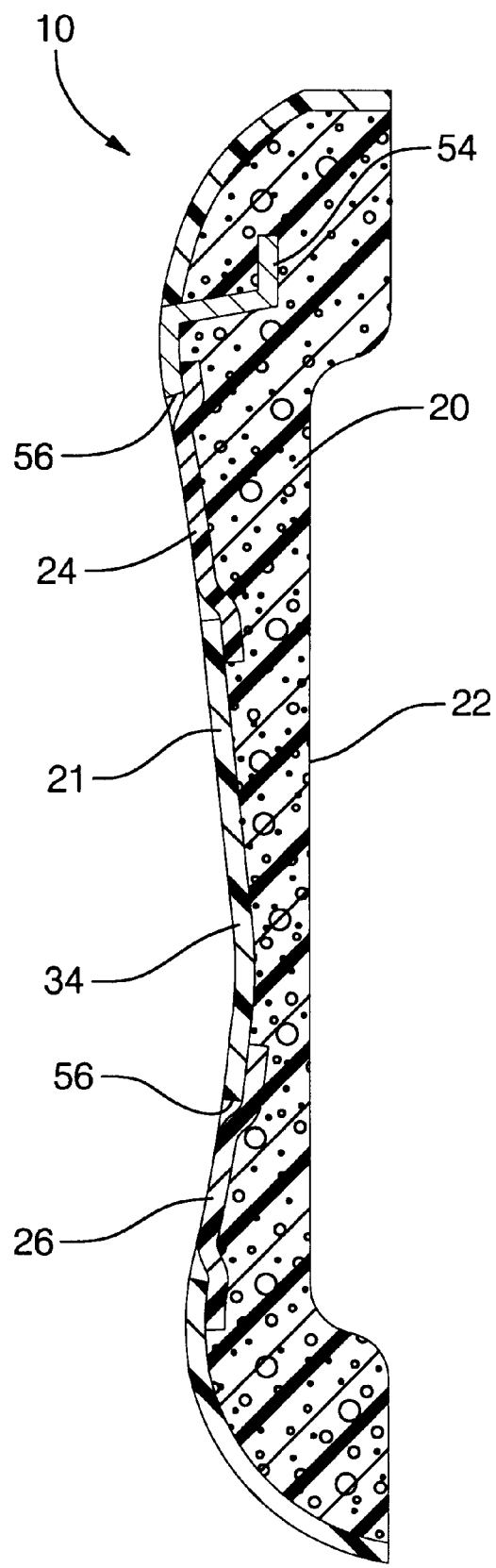
FIG. 5 is a fragmentary side view of the door trim panel assembly of FIG. 1.

Referring to FIGS. 1, 2 and 5, the door trim panel assembly 10 includes a carrier 20 extending longitudinally and vertically and having a generally rectangular shape. The carrier 20 is made of a plastic material such as polypropylene. Preferably, the carrier 20 is made of expanded polypropylene. The carrier 20 is formed by a method, according to the present invention, to be described. The carrier 20 has an inner side 21 and an outer side 22. The outer side 22 is attached to the inner panel 16 of the door 12 by suitable means such as fasteners (not shown).

The door trim panel assembly 10 also includes a plurality of components incorporated or integrated into the carrier 20. The components may include an insert 24. The insert 24 extends longitudinally and vertically. The insert 24 is made of a fabric, cloth, vinyl, TPO (Thermoplastic Polyolefin), leather or carpet material. Preferably, the insert 24 is pre-blanked formed by conventional process known in the art. The insert 24 is bonded to the inner side 21 of the carrier 20 by melting and fusion of the plastic material of the carrier 20. It should be appreciated that the insert 24 is a separate piece or component.

The components may also include a map pocket closeout 26. The map pocket closeout 26 is generally rectangular in shape. The map pocket closeout 26 is made of a fabric, cloth, vinyl, TPO (Thermoplastic Polyolefin), leather or carpet material. Preferably, the insert 24 is pre-blanked formed by conventional process known in the art. The map pocket closeout 26 is bonded to the inner side 21 of the carrier 20 by melting and fusion of the plastic material of the carrier 20. It should be appreciated that the map pocket closeout 26 is a separate piece of component.

The components may further include at least one, preferably a plurality of side impact blocks 28. The side impact blocks 28 extend longitudinally and vertically in shape. The side impact blocks 28 are made of a plastic material such as polypropylene. The features of the side impact blocks 28 are molded as part of the outer side 22 of the carrier 20 by the plastic material of the carrier 20. It should be appreciated that the side impact blocks 28 and carrier 20 are integral, unitary and formed as one-piece.

The components may also include a sound absorber 30. The sound absorber 30 is generally rectangular in shape. The sound absorber 30 is made of a plastic material such as polypropylene. The features of the sound absorber 30 are molded as part of the outer side 22 of the carrier 20 by the plastic material of the carrier 20. It should be appreciated that the sound absorber 30 and carrier 20 are integral, unitary and formed as one-piece.

The components may include a water barrier 32. The water barrier 32 is generally rectangular in shape and overlaps a portion of the inner panel 16 of the door 12 in a flow direction. The water barrier 32 is made of a plastic material such as polypropylene. The features of the water barrier 32 are molded as part of the outer side 22 of the carrier 20 by the plastic material of the carrier 20. It should be appreciated that the water barrier 32 and carrier 20 are integral, unitary and formed as one-piece.

The door trim panel assembly 10 includes a finished door trim substrate 34. The door trim substrate 34 extends longitudinally and vertically and is generally rectangular in shape. The carrier 20 conforms to the shape of the door trim substrate 34 such that the carrier 20 is disposed within the door trim substrate 34. The door trim substrate 34 is made of a relatively rigid material such as hard plastic, covered plastic, and covered cellulose based material or composite of the like. The covering can be fabric, vinyl, cloth, TPO, leather or carpet. The door trim substrate 34 is formed by a suitable thermoplastic molding or forming process such as injection molding, compression molding, thermoforming or the like. Preferably, the door trim substrate 34 is made of polypropylene and formed by conventional injection molding processes as is known in the art. The door trim substrate 34 is attached to the carrier 20 by molding the carrier 20 to the door trim substrate 34 by a method to be described. It should be appreciated that the door trim substrate 34 presents a class A surface as is known in the art. It should also be appreciated that the door trim substrate 34 is conventional and known in the art.

Figure 3:
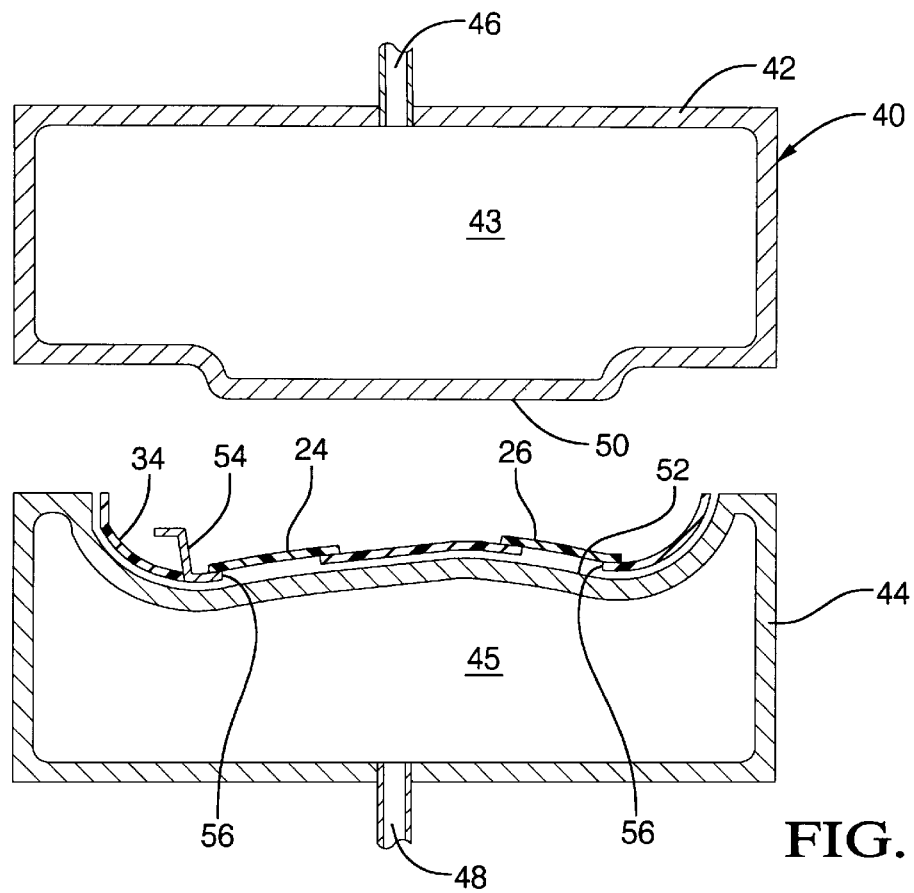
FIG. 3 is a fragmentary side view of a mold used in a method, according to the present invention, of making the door trim panel assembly of FIG. 1 illustrated in an open position.
Figure 4:
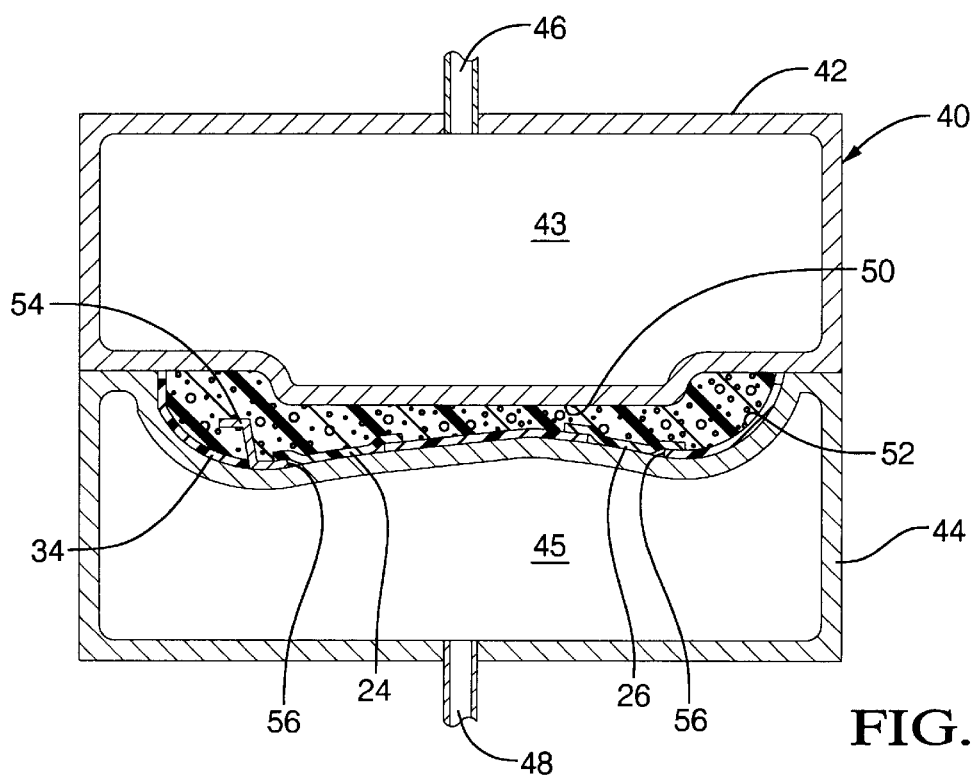
FIG. 4 is a fragmentary side view of the mold of FIG. 3 illustrated in a closed position after the part is formed.

Referring to FIGS. 3 and 4, a method, according to the present invention, of making the door trim panel assembly 10 is disclosed. As illustrated, a mold, generally indicated at 40, includes a first half mold 42 and a second half mold 44. The first and second half molds 42 and 44 are generally hollow to form a chamber 43 and 45, respectively. The first and second half molds 42 and 44 have an inlet 46 and 48, respectively, for allowing a fluid such as steam to enter the chamber 43 and 45 of the first and second half molds 42 and 44. The first and second half molds 42 and 44 each include a mold cavity 50 and 52, respectively, for forming the carrier 20. The first half mold 42 includes at least one, preferably a plurality of fill inlets (not shown) extending into the mold cavity 50 and 52 to allow fill guns (not shown) to fill the mold cavity 50 and 52 with the plastic material for the carrier 20. It should be appreciated that the mold 40 is conventional and known in the art.

The method, according to the present invention, includes the step of forming the door trim substrate 34 by conventional processes such as injection molding or other suitable thermoplastic molding or forming process (i.e., compression molding, thermoforming, etc.). The door trim substrate 34 is preferably designed with at least one, preferably a plurality of "undercut" members 54 to facilitate mechanical bonding of the carrier 20. The method includes the step of preheating the door trim substrate 34 using an infrared oven (not shown) or the like. Preferably, the door trim substrate 34 would be demolded from the injection molder (not shown) at higher-than-ambient temperature and placed into the cavity 50 and 52 of the mold 40.

The method includes the step of placing the door trim substrate 34 into the cavity 50 and 52 of the mold 40. The method includes the step of placing at least one, preferably a plurality of the components into the cavity 50 and 52 of the mold 40. In particular, the insert 24 and map pocket closeout 26 are placed into the cavity 50 and 52 of the mold 40 at a location where an opening 56 exists on the door trim substrate 34. The insert 24 and map pocket closeout are positioned to completely cover their respective opening 56 in the door trim substrate 34. Alternatively, the insert 24 and map pocket closeout 26 could be pre-joined to the door trim substrate 34 by suitable means such as an adhesive (not shown). A further alternative for pre-joining the insert 24 and map pocket closeout to the door trim substrate 34 could be tapered pins (not shown) molded into the door trim substrate 34 and extended into apertures (not shown) blanked into the insert 24 and map pocket closeout 26. It should be appreciated that the apertures would be slightly smaller in diameter than the pins, allowing the insert 24 and map pocket closeout 26 to be secured by forcing the material over the pins. It should also be appreciated that the cavities 50 and 52 are shaped to mold the components for the side impact blocks 28, sound absorber 30 and water barrier 32, which are molded into the carrier 20.

The method includes the steps of closing the mold 40 and filling the cavity 50 and 52 with the plastic material for the carrier 20. In the preferred embodiment, the plastic material is expanded polypropylene. As such, the cavity 50 and 52 is filled with beads of expanded polypropylene, which enter the mold 40 via the fill inlets. Next, the method includes the step of introducing steam into the mold 40 via the inlets 46 and 48 to expand the plastic material and bonding the plastic material to the insert 24, map pocket closeout 26, and door trim substrate 34 to form a single door trim panel assembly 10. In particular, steam enters the chambers 43 and 45 of the first and second half molds 42 and 44, respectively, through the inlets 46 and 48. The beads of expanded polypropylene are fused together with mechanical and thermoplastic bonding occurring to the door trim substrate 34. It should be appreciated that the steam enters through openings in the door trim substrate 34 and through openings in the first half mold 42 to expand the beads of polypropylene.

The method may include the step of cooling the mold 40 by spraying a coolant such as water through nozzles (not shown) onto the backside of the cavity 50 and 52 of the mold 40. Once the door trim panel assembly 10 is cooled or after a suitable time for fusion and cooling, the method includes the step of opening the mold 40 and removing or demolding the door trim panel assembly 10 from the mold 40. Finally, the method includes the step of attaching the door trim panel assembly 10 to the inner panel 16 of the door 14 by suitable means such as fasteners, adhesives, heat staking, sonic welding or the like.

Accordingly, the method of making the door trim panel assembly 10 reduces the amount of direct labor required to assemble the carrier 20 to the door trim substrate 34. The method also allows the door trim substrate 34 to be thinned to approximately two millimeters as one integral composite panel, reducing in material savings and faster injection molding cycles. The method allows flexibility to separate the carrier 20 into segregated areas without building individual tools. The method also eliminates equipment and tools required for joining the carrier 20 to the door trim substrate 34.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of making a door trim panel assembly for attachment to an inner panel of an automotive vehicle, said method comprising the steps of:

pre-heating a door trim substrate;

placing the door trim substrate into a cavity of a mold;

placing at least one component into the cavity and at a location where an opening exists in the door trim substrate to cover the opening;

filling the cavity with a plurality of expanded polypropylene beads; and introducing steam into the mold to expand the beads to form a carrier and bonding the carrier against the at least one component and door trim substrate to form a single door trim panel assembly.

2. A method as set forth in claim 1 including the step of forming the door trim substrate prior to said step of placing.

3. A method as set forth in claim 2 wherein the door trim substrate is formed from a hard plastic, covered plastic, covered cellulose based material or a composite thereof.

4. A method as set forth in claim 3 wherein the plastic is polypropylene.

5. A method as set forth in claim 2 wherein said step of forming comprises forming the door trim substrate by injection molding, thermoplastic molding, compression molding, or thermoforming.

6. A method as set forth in claim 1 including the step of pre-heating the door trim substrate prior to said step of filling.

7. A method as set for the in claim 1 wherein said step of placing comprises placing an insert and map pocket closeout into a cavity of the mold.

8. A method as set forth in claim 1 wherein said step of introducing comprises introducing steam into a chamber behind the cavity to expand the plastic beads.

9. A method as set forth in claim 1 including the step of cooling the door trim panel assembly prior to removing the door trim panel assembly from the mold.

10. A method of making a door trim panel assembly for attachment to an inner panel of an automotive vehicle, said method comprising the steps of:

molding a door trim substrate of polypropylene;

pre-heating the door trim substrate;

placing the door trim substrate into a cavity of a mold;

placing an insert into the cavity and at a location where an opening exists in the door trim substrate to cover the opening;

filling the cavity with a plurality of expanded polypropylene beads;

introducing steam into a chamber behind the cavity of the mold to expand the beads to form a carrier and bonding the carrier against the insert and door trim substrate to form a single door trim panel assembly.

11. A method as set forth in claim 10 wherein the door trim substrate is formed from a hard plastic, covered plastic, covered cellulose based material or a composite thereof.

12. A method as set forth in claim 10 wherein said step of forming comprises forming the door trim substrate by injection molding, thermoplastic molding, compression molding, or thermoforming.

13. A method of making a door trim panel assembly for attachment to an inner panel of an automotive vehicle, said method comprising the steps of:

molding a door trim substrate of polypropylene;

pre-heating the door trim substrate;

placing the door trim substrate into a cavity of a mold;

placing an insert into the cavity and at a location where an opening exists in the door trim substrate to cover the opening;

filling the cavity with a plurality of expanded polypropylene beads;

introducing steam into a chamber behind the cavity of the mold to expand the beads to form a carrier and bonding the carrier against the insert and door trim substrate to form a single door trim panel assembly.

* * * * *